(12) United States Patent
Joo et al.

(10) Patent No.: US 10,995,898 B2
(45) Date of Patent: May 4, 2021

(54) GIMBAL

(71) Applicant: Choong Ryul Lee, Seoul (KR)

(72) Inventors: Ji Hoon Joo, Gimpo-si (KR); Woo Hyung Jung, Seocho-gu (KR); Choong Ryul Lee, Gwanak-gu (KR); Hye Yeon Na, Gwangmyeong-si (KR)

(73) Assignee: Choong Ryul Lee, Seoul (KR)

( * ) Notice: Subject to any disclaimer, the term of this patent is extended or adjusted under 35 U.S.C. 154(b) by 160 days.

(21) Appl. No.: 16/304,901

(22) PCT Filed: Sep. 7, 2018

(86) PCT No.: PCT/KR2018/010508
§ 371 (c)(1),
(2) Date: Nov. 27, 2018

(87) PCT Pub. No.: WO2019/066300
PCT Pub. Date: Apr. 4, 2019

(65) Prior Publication Data
US 2020/0332945 A1 Oct. 22, 2020

(30) Foreign Application Priority Data
Sep. 27, 2017 (KR) .................. 10-2017-0125419

(51) Int. Cl.
*F16M 11/12* (2006.01)
*F16M 11/14* (2006.01)
*G03B 17/56* (2021.01)

(52) U.S. Cl.
CPC ........... *F16M 11/123* (2013.01); *F16M 11/14* (2013.01); *G03B 17/561* (2013.01)

(58) Field of Classification Search
CPC ..... F16M 11/123; F16M 11/14; G03B 17/561
USPC .......................................... 248/183.1, 183.2
See application file for complete search history.

(56) References Cited

U.S. PATENT DOCUMENTS

| 2017/0054887 A1* | 2/2017 | Wei .................. H04N 5/23216 |
| 2017/0064176 A1* | 3/2017 | Kim ...................... F16M 11/041 |
| 2017/0089513 A1* | 3/2017 | Pan ...................... G03B 15/006 |
| 2017/0241589 A1* | 8/2017 | Wang .................... F16M 11/08 |
| 2019/0079373 A1* | 3/2019 | Wang .................... F16M 11/10 |
| 2019/0154191 A1* | 5/2019 | Ma ...................... F16M 11/2071 |

(Continued)

FOREIGN PATENT DOCUMENTS

| KR | 101210883 B1 | 12/2012 |
| KR | 101316851 B1 | 10/2013 |
| KR | 20140131641 A | 11/2014 |

(Continued)

OTHER PUBLICATIONS

International Search Report of the International Searching Authority issued in the corresponding PCT International Application No. PCT/KR2018/0510508, dated Dec. 13, 2018 (3 pages).

(Continued)

*Primary Examiner* — Muhammad Ijaz
(74) *Attorney, Agent, or Firm* — Adams and Reese LLP; Raymond R. Ferrera

(57) ABSTRACT

The present disclosure relates to a gimbal, and more particularly, to a gimbal for preventing gimbal lock from occurring due to interference between axes, thereby not limiting shooting composition.

8 Claims, 10 Drawing Sheets

(56) References Cited

U.S. PATENT DOCUMENTS

2019/0349533 A1* 11/2019 Guo ..................... F16M 11/18

FOREIGN PATENT DOCUMENTS

| KR | 10-1667394 | 10/2016 |
|----|------------|---------|
| KR | 101667394 B1 | 10/2016 |
| KR | 10-2017-0125419 | 9/2017 |

OTHER PUBLICATIONS

SPG PLUS, https://blog.naver.com/PostPrint.nhn?blogId=moztech&logNo=220966353749, Oct. 30, 2018 with machine translation (17 pages).
https://blog.naver.com/moztech/220966353749, SPG PLUS, Mar. 24, 2017, 8 pages.

* cited by examiner

GIMBAL

TECHNICAL FIELD

The present disclosure relates to a gimbal, and more particularly, to a gimbal for preventing gimbal lock from occurring due to interference between axes, thereby not limiting shooting composition.

BACKGROUND ART

A gimbal is an apparatus that maintains a camera or the like in a constant position such that, despite the movement of a user, an image does not lose focus during a tracking shot.

FIG. 1 is a diagram illustrating an example of a 3-axis gimbal according to the related art. Since the 3-axis gimbal shown in FIG. 1 has a yaw-roll-pitch sequence, interference between axes occurs when a portrait shot is taken in a vertical position. In other words, a pitch axis coincides with a yaw axis, causing gimbal lock in which the tilt function of the pitch axis disappears. Accordingly, only 2-axis driving is available, deteriorating the function of the gimbal and limiting shooting composition.

Gimbal lock limits the possible composition of a shot during portrait shooting. In other words, since the gimbal in the vertical position cannot be controlled in a vertical direction during portrait shooting, only horizontal composition is available. For example, when a subject is approaching from below or above the gimbal in this state, it is impossible to shoot the subject.

In addition, according to the related art, gimbals only have functions such as keeping the balance of a shooting device and performing a tracking shot of a certain subject, but are limited with respect to the collection of voice information or do not allow a user's voice command to be used.

Therefore, there is a need to develop a gimbal that prevents gimbal lock, has no limit in shooting composition, effectively collects voice information, and recognizes a user's voice command.

DESCRIPTION OF EMBODIMENTS

Technical Problem

Provided is a gimbal for preventing gimbal lock from occurring due to interference between axes, thereby not limiting shooting composition.

Provided is also a gimbal including a microphone installed in a grip portion or an axis compensator, thereby allowing voice information to be collected effectively, and operating according to a user's voice command.

Solution to Problem

According to an aspect of the present disclosure, a gimbal used for an information collecting device for shooting or recording includes a stand; a first axis compensator connected to the stand and configured to produce a yaw motion; a second axis compensator connected to the first axis compensator and configured to produce a pitch motion; a third axis compensator connected to the second axis compensator and configured to produce a roll motion; and a connector configured to connect the information collecting device and the third axis compensator to each other, wherein a yaw axis, a pitch axis, and a roll axis are sequentially connected between the stand and the information collecting device.

According to a preferred embodiment, the first axis compensator may include a first housing connected to the stand; and a first power unit configured to rotate around a first rotation shaft to produce the yaw motion, the first rotation shaft extending in a vertical direction. The second axis compensator may include a second housing connected to the first rotation shaft of the first power unit and configured to perform the yaw motion; and a second power unit embedded in the second housing and configured to rotate around a second rotation shaft to produce the pitch motion, the second rotation shaft extending in a horizontal direction. The third axis compensator may include a third housing connected to the second rotation shaft of the second power unit and configured to perform the pitch motion; and a third power unit embedded in the third housing and configured to rotate around a third rotation shaft to produce the roll motion, the third rotation shaft extending in the horizontal direction and being orthogonal to the second rotation shaft.

According to a preferred embodiment, the second housing may have a spherical shape and include a second first housing combined with a second second housing, the second first housing having a hemispherical shape and arranged in a front portion of the second housing, and the second second housing having a hemispherical shape and arranged in a back portion of the second housing. The second first housing may have a bottom connected to the first rotation shaft such that the yaw motion may be performed. The second power unit may be fixed to the second first housing. The second second housing may be connected to the second rotation shaft such that the pitch motion may be performed.

According to a preferred embodiment, the third housing may have a spherical shape and include a third first housing combined with a third second housing, the third first housing having a hemispherical shape and arranged in a right portion of the third housing, and the third second housing having a hemispherical shape and arranged in a left portion of the third housing. The third first housing may have a bottom connected to the second rotation shaft such that the pitch motion may be performed. The third power unit may be fixed to the third first housing. The third-second housing may be connected to the third rotation shaft such that the roll motion may be performed.

According to a preferred embodiment, the connector may be connected to the third second housing and the information collecting device to enable the information collecting device to perform the roll motion.

According to a preferred embodiment, the gimbal may further include a microphone module. The microphone module may be connected to at least one of the stand, the first axis compensator, the second axis compensator, and the third axis compensator.

According to a preferred embodiment, the gimbal may further include a speaker module. The speaker module may be connected to at least one of the stand, the first axis compensator, the second axis compensator, and the third axis compensator.

According to a preferred embodiment, the gimbal may further include a lighting module which produces light. The lighting module may be connected to at least one of the stand, the first axis compensator, the second axis compensator, and the third axis compensator.

According to a preferred embodiment, the gimbal may further include a holder connected to the connector and configured to grip the information collecting device.

According to a preferred embodiment, the holder may include a gripper configured to grip the information collecting device; and a sensor configured to generate a signal for controlling an operation of the gripper.

ADVANTAGEOUS EFFECTS OF DISCLOSURE

According to embodiments of the present disclosure, a gimbal includes a first axis compensator configured to produce a yaw motion, a second axis compensator connected to the first axis compensator and configured to produce a pitch motion, a third axis compensator connected to the second axis compensator and configured to produce a roll motion, and a connector configured to connect an information collecting device and the third axis compensator to each other, wherein a yaw axis, a pitch axis, and a roll axis are sequentially connected between a stand and an information collecting device, thereby preventing interference between axes, i.e., gimbal lock.

In addition, according to embodiments of the present disclosure, a gimbal includes a first axis compensator, a second axis compensator, and a third axis compensator, each of which has a certain solid structure such as a spherical or cylindrical shape, and therefore, the whole structure of the gimbal may be simple and compact. In particular, since the axis compensators are arranged in a line in a vertical direction to form a tower structure which is similar to the structure of a selfie device (e.g., a selfie stick) according to the related art, it may be easy to carry and store the gimbal and the gimbal may be prevented from breaking down during storage.

In addition, according to embodiments of the present disclosure, a gimbal includes a microphone module, thereby allowing voice command reception and sound signal collection to be performed effectively.

In addition, according to embodiments of the present disclosure, a gimbal includes a certain subject capturing and tracking algorithm, thereby allowing information such as video, audio, etc. to be collected effectively.

BEST MODE

According to an aspect of the present disclosure, a gimbal used for an information collecting device for shooting or recording includes a stand; a first axis compensator connected to the stand and configured to produce a yaw motion; a second axis compensator connected to the first axis compensator and configured to produce a pitch motion; a third axis compensator connected to the second axis compensator and configured to produce a roll motion; and a connector configured to connect the information collecting device and the third axis compensator to each other, wherein a yaw axis, a pitch axis, and a roll axis are sequentially connected between the stand and the information collecting device.

MODE OF DISCLOSURE

Hereinafter, embodiments of the present disclosure will be described with reference to the accompanying drawings.

Figure 1:
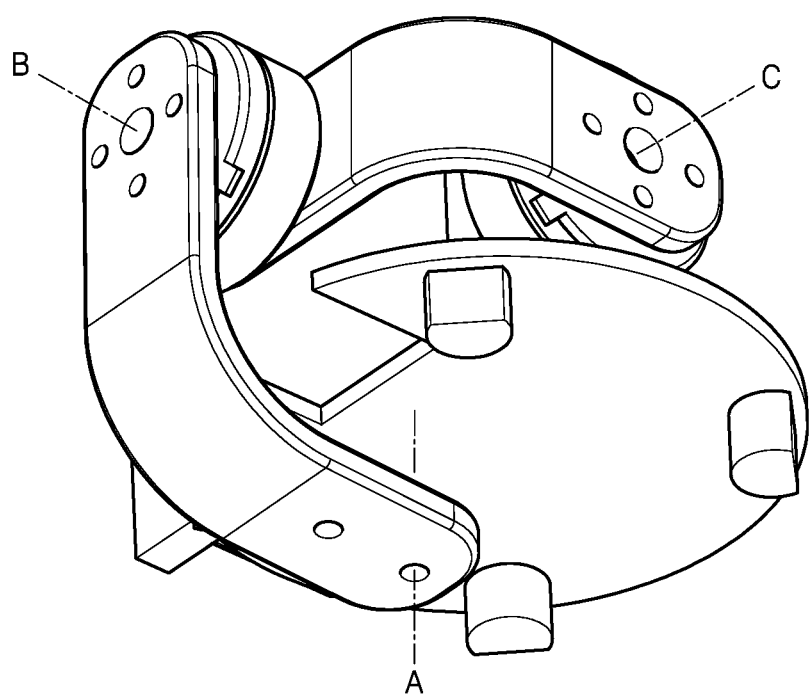
FIG. 1 is a diagram of an example of a 3-axis gimbal according to the related art.
Figure 2:
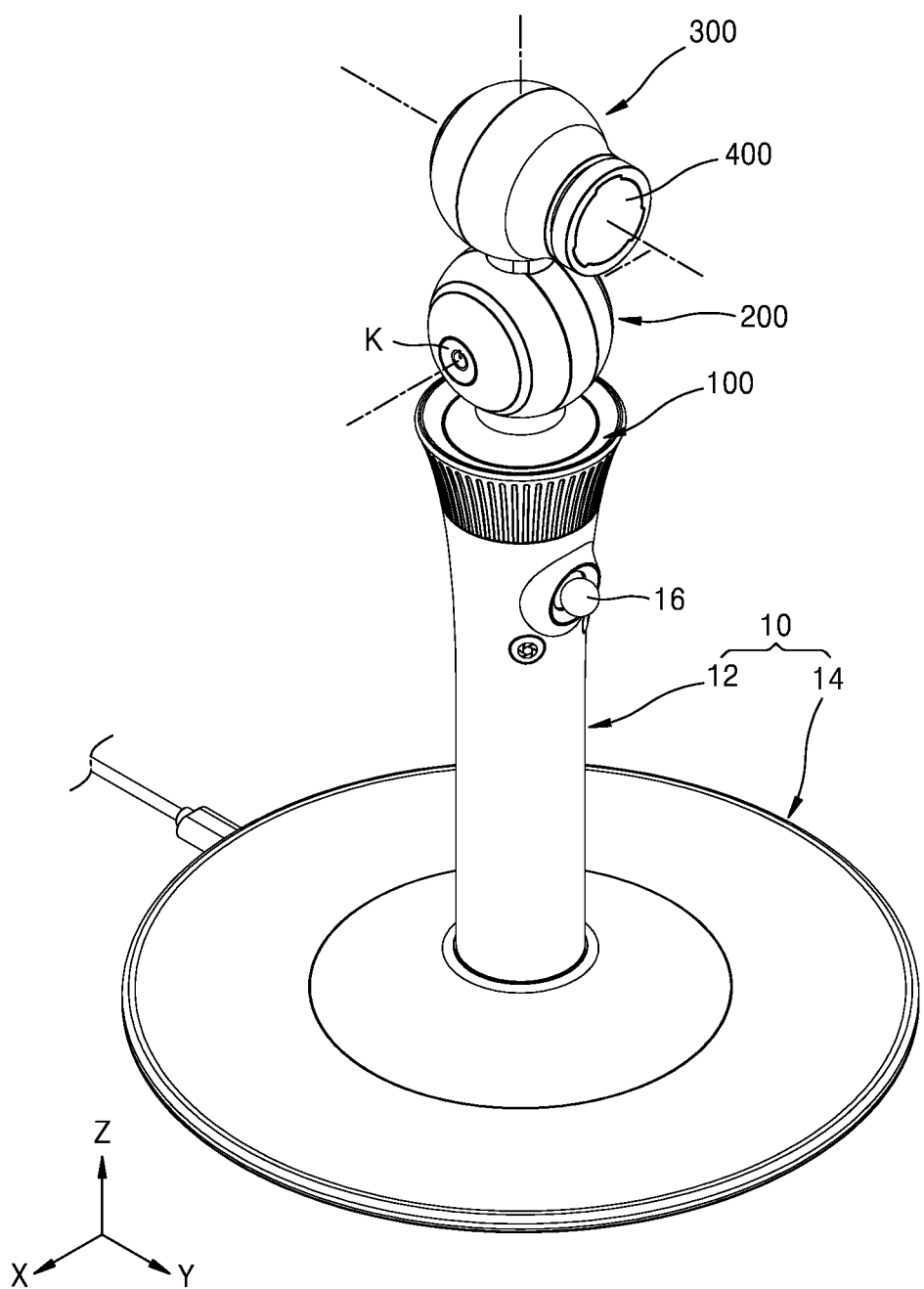
FIG. 2 is a diagram of a gimbal according to an embodiment of the present disclosure.
Figure 3:
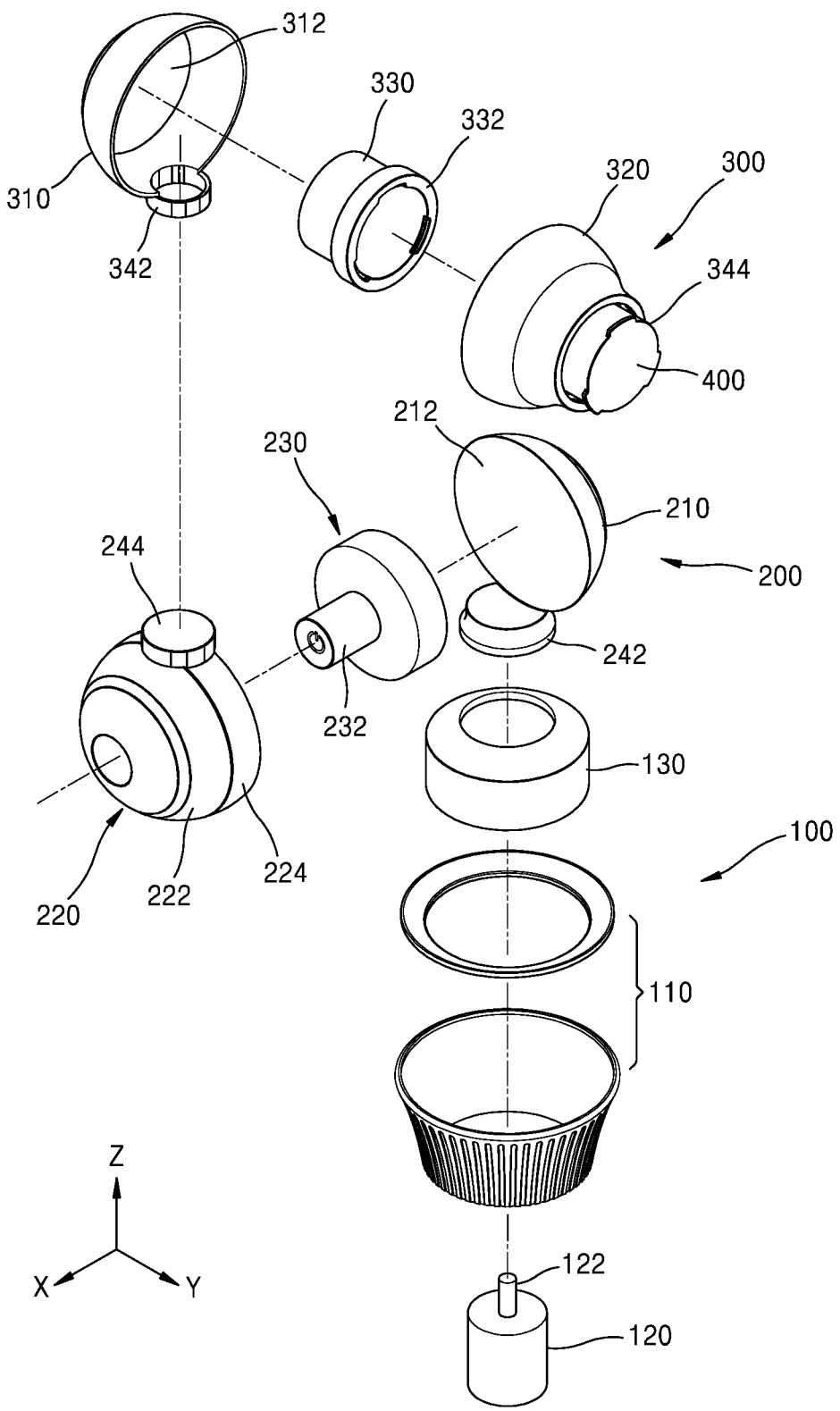
FIG. 3 is a diagram of a structure of a gimbal, according to an embodiment of the present disclosure.

FIG. 2 is a diagram of a gimbal according to an embodiment of the present disclosure. FIG. 3 is a diagram of the structure of a gimbal, according to an embodiment of the present disclosure.

According to embodiments of the present disclosure, a gimbal is used for an information collecting device that performs shooting, recording, etc. The gimbal may include a stand 10, a first axis compensator 100, a second axis compensator 200, a third axis compensator 300, a connector 400 connecting to the information collecting device, and a sensor device (not shown) measuring a rotation angle of each axis compensator.

The stand 10 is a member that may be gripped in a user's hand or installed in a certain device. The stand 10 may include a grip portion 12 having a rod shape and a supporting portion 14 to which a bottom of the grip portion 12 is connected so that the grip portion 12 may be erected. Desirably, the grip portion 12 may include an operating portion 16 that may operate the operation of the gimbal, a certain controller that may control the operation of the gimbal, and a power source that supplies power, but the present disclosure is not limited thereto. In addition, the supporting portion 14 may be connected to an external power supply to be supplied with power, but the present disclosure is not limited thereto.

The first axis compensator 100 is a member that is connected to the stand 10 and produces a yaw motion. Desirably, the first axis compensator 100 may be located on a top of the grip portion 12 when the grip portion 12 is erected on the supporting portion 14.

The first axis compensator 100 may include a first housing 110 and a first power unit 120.

The first housing 110 may be fixed onto the grip portion 12 and have an inner space in which the first power unit 120 is embedded. The first housing 110 may be continuously and integrally formed with the grip portion 12.

The first power unit 120 may include a member like a motor which is provided with power to produce a torque. The first power unit 120 may be embedded and fixed in the first housing 110. The first power unit 120 includes a first rotation shaft 122 extending in a vertical direction and produces a yaw motion by rotating the first rotation shaft 122. In other words, the first power unit 120 enables a member connected to the first rotation shaft 122 to perform a yaw motion by rotating the first rotation shaft 122 extending in the vertical direction. Here, the vertical direction may coincide with a direction, in which the grip portion 12 is erected on the supporting portion 14, and is represented with a Z axis in FIG. 3. Meanwhile, it is apparent that the vertical direction varies with the alignment of the gimbal.

Desirably, a first neck portion 130 connected to a second housing, which is connected to the first rotation shaft 122 and described below, may be provided above the first power unit 120.

The second axis compensator 200 may include the second housing and a second power unit 230.

The second housing is located above the first housing 110. Desirably, the second housing may have overall a spherical shape but is not limited thereto. The second housing may have a cylindrical shape or any other solid shape.

The second housing is divided into at least two members in a horizontal direction and configured by combining the at least two members. Here, the horizontal direction is a direction on a plane perpendicular to the extension direction of the first rotation shaft 122. The horizontal direction may be called, for example, an anteroposterior direction and simultaneously refers to a pitch axis direction. The anteroposterior direction is represented with an X-axis direction in FIG. 3. Accordingly, the second housing may have a configuration in which a second first housing 210 in a front portion is combined with a second second housing 220 in a back portion. Accordingly, the second first housing 210 is parallel with the second second housing 220 in the pitch axis direction.

When the second housing has a spherical shape, the second housing may include the second first housing 210 and the second second housing 220, of which each has a hemispherical shape. When the second housing has a cylindrical shape, the second housing may include the second first housing 210 and the second second housing 220, of which each has a cylindrical shape. However, the present disclosure is not limited thereto, and it is sufficient that there is provided a second housing that has a certain solid shape such as a spherical or cylindrical shape and at least a portion of the second housing or a certain member connected to the second housing is rotatable by the second power unit 230. For example, a second housing having a cylindrical shape may be provided, and at least a portion of the second housing may have a band shape and be rotatable.

A bottom of the second housing is connected to the first rotation shaft 122, so that the second housing may perform a yaw motion. In detail, a bottom of the second first housing 210 is connected to the first rotation shaft 122 and the second second housing 220 is connected to the second first housing 210, so that the second second housing 220 may perform a yaw motion integrally with the second first housing 210.

Desirably, a second first neck portion 242 may be provided at the bottom of the second first housing 210 and connected to the first neck portion 130. In addition, desirably, a second second neck portion 244 may be provided at a top of the second second housing 220 and connected to a third housing, which will be described below. Besides, a certain fixing means (not shown), which may be connected to a second rotation shaft 232 of the second power unit 230, may be provided inside the second second housing 220. Desirably, the second first neck portion 242 and the first neck portion 130 may have electrically connectable wiring systems therein to electrically connect a controller embedded in the stand 10 or a power supply to the second power unit 230, so that electrical signals may be exchanged.

A space, in which the second power unit 230 may be embedded, may be provided in the second housing. In detail, a fixing means 212, to which the second power unit 230 may be fixed, may be provided inside the second first housing 210. In addition, the second second housing 220 may be connected to the second rotation shaft 232 of the second power unit 230, thereby performing a pitch motion due to the second power unit 230. In other words, the second second housing 220 may simultaneously perform a yaw motion due to the first power unit 120 and a pitch motion due to the second power unit 230.

Similarly to the first power unit 120, the second power unit 230 may include a member like a motor which is provided with power to produce a torque. The second power unit 230 may be embedded in the second housing, and more particularly, embedded and fixed in the second first housing 210. The second power unit 230 includes the second rotation shaft 232, which extends in the anteroposterior direction, i.e., the X-axis direction, and produces a pitch motion. In other words, the second power unit 230 enables the second second housing 220 connected to the second rotation shaft 232 to perform a pitch motion by rotating the second rotation shaft 232 extending in the anteroposterior direction.

Although a certain power button K is provided in a side of the second housing in FIG. 2, the present disclosure is not limited thereto.

Figure 4:
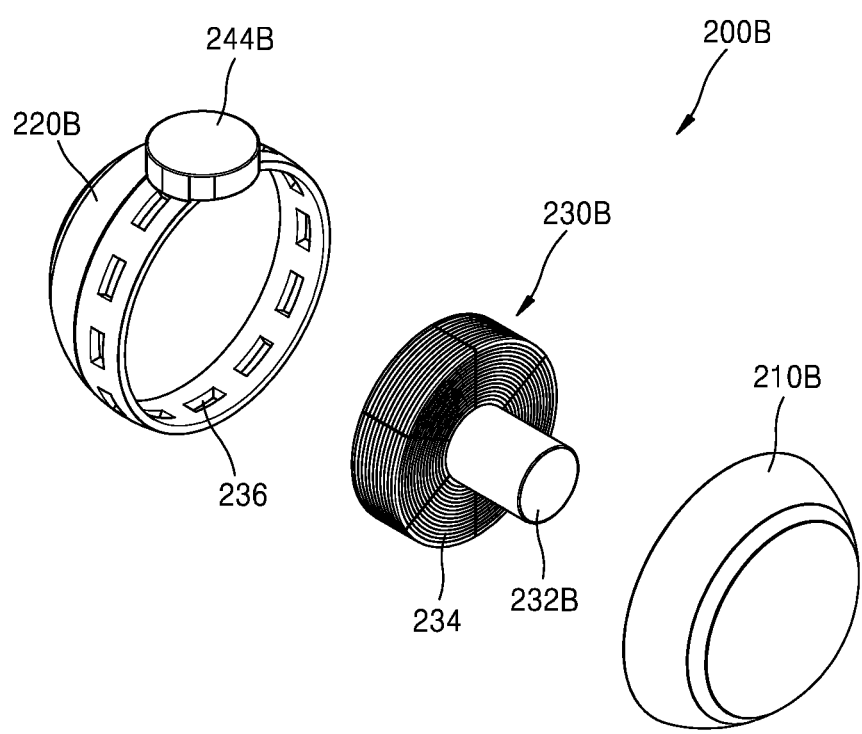
FIG. 4 is a diagram of a structure of a second axis compensator, according to an embodiment of the present disclosure.
Figure 5:
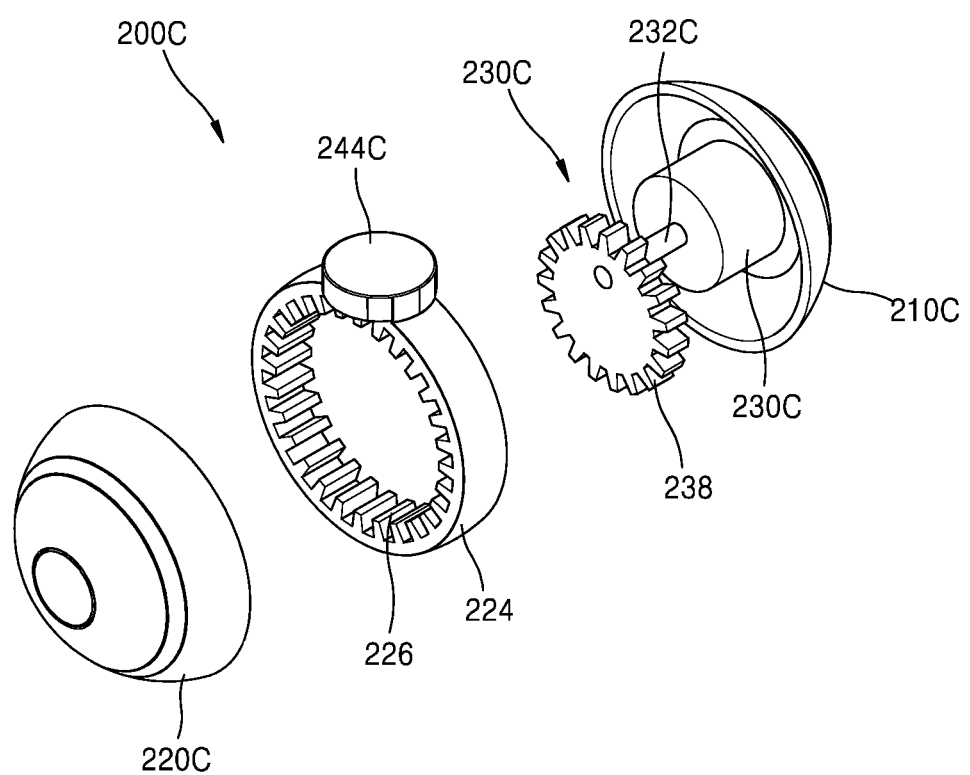
FIG. 5 is a diagram of a structure of a second axis compensator, according to an embodiment of the present disclosure.

Meanwhile, the second axis compensator 200 may have a structure of FIG. 4 or 5. FIGS. 4 and 5 are each diagrams of the structures of the second axis compensator 200, according to some embodiments of the present disclosure.

Referring to FIG. 4, a magnet 236 may be located on an inner surface of the second second housing 220B in a circumferential direction in a second axis compensator 200B. The second second neck portion 244B may be provided at a top of the second second housing 220B. The second power unit 230B may have a rotor around which a coil 234 is wound. In addition, the second second housing 220B may be combined with the second first housing 210B such that the second second housing 220B and the second first housing 210B is relatively rotatable with respect to each other. Desirably, a certain bearing (not shown) may be provided between the second first housing 210B and the second second housing 220B, thereby enabling rotation with low friction. When electric power is applied to the coil 234 wound around the rotor in the structure described above, the second second housing 220B may be rotated due to a magnetic field of the magnet 236 fixed inside the second second housing 220B and current flowing in the coil 234 of the rotor. At this time, the second rotation shaft 232B of the second power unit 230B may be rotated with being fixed to the second second housing 220B.

Referring to FIG. 5, the second housing of a second axis compensator 200C may be divided into the second first housing 210C and the second second housing 220C and may be configured by combining second first housing 210C with the second second housing 220C. A rotating band 224 having a ring shape may be provided between the second first housing 210C and the second second housing 220C. The second second neck portion 244C may be provided at a top of the rotating band 224. In the structure of FIG. 5, the second first housing 210C and the second second housing 220C may be fixed to each other and the rotating band 224 may be connected to the second rotation shaft 232C of the second power unit 230C such that the rotating band 224 may relatively rotate with respect to the second first housing 210C and the second second housing 220C. In addition, a ring gear 226 may be provided on an inner surface of the rotating band 224 and a rotation gear 238, which is eccentric to the second rotation shaft 232C of the second power unit 230C and has an outer surface engaging with the ring gear 226, may be provided such that the rotating band 224 may be rotatable.

Examples of the mode of the disclosure have been described above. Any configuration will do if a certain type of the second power unit 230 is embedded in the second housing of the second axis compensator 200 and at least a portion of the second housing or a certain member connected to the second housing is rotated by the second power unit 230.

The third axis compensator 300 may include a third housing and a third power unit 330.

The third housing is located above the second housing. Desirably, the third housing may have overall a spherical shape. Accordingly, when both of the second and third housings have a spherical shape, the second axis compensator 200 and the third axis compensator 300 may form a structure in which spherical members are parallel with each other in the vertical direction.

However, the shape of the third housing is not limited to the spherical shape and may have a cylindrical shape or any other solid shape.

The third housing is divided into at least two members and configured by combining the at least two members in the horizontal direction and simultaneously in a direction orthogonal to the second rotation shaft 232. Here, the horizontal direction is a direction on the plane perpendicular to the first rotation shaft 122, as described above. Since the division and combination direction of the third housing is the horizontal direction and simultaneously is orthogonal to the second rotation shaft 232, the division and combination direction of the third housing may be called a left-and-right direction and simultaneously refers to a roll axis direction. The left-and-right direction is represented with a Y-axis direction in FIG. 3. Accordingly, the third housing may have a configuration in which a third first housing 310 at a side is combined with a third second housing 320 at an opposite side. Accordingly, the third first housing 310 is parallel with the third second housing 320 in the roll axis direction.

When the third housing has a spherical shape, the third first housing 310 and the third second housing 320 may each have a hemispherical shape. When the third housing has a cylindrical shape, the third first housing 310 and the third second housing 320 may each have a cylindrical shape. However, the present disclosure is not limited thereto, and it is sufficient that there is provided a third housing that has a certain solid shape such as a spherical or cylindrical shape and at least a portion of the third housing or a certain member connected to the third housing is rotatable by the third power unit 330.

A bottom of the third housing is connected to the second rotation shaft 232, so that the third housing may perform a pitch motion. In detail, a bottom of the third first housing 310 is connected to the second rotation shaft 232 and the third second housing 320 is connected to the third first housing 310, so that the third second housing 320 may perform a pitch motion integrally with the third first housing 310. At this time, since the second housing may perform a yaw motion due to the first power unit 120, the third housing may also perform the yaw motion together with the second housing.

Desirably, a third first neck portion 342 may be provided at the bottom of the third first housing 310 and connected to the second second neck portion 244. In addition, a third second neck portion 344 may be provided in the third second housing 320. Besides, a certain fixing means (not shown), which may be connected to a third rotation shaft 332 of the third power unit 330, may be provided inside the third second housing 320. The third second neck portion 344 may protrude in the Y-axis direction, and the connector 400, to which an information collecting device may be connected, may be provided at an end of the third second neck portion 344.

Desirably, the third first neck portion 342 and the second second neck portion 244 may have electrically connectable wiring systems therein to electrically connect a controller embedded in the stand 10 or a power supply to the third power unit 330, so that electrical signals may be exchanged.

A space, in which the third power unit 330 may be embedded, may be provided in the third housing. In detail, a fixing means 312, to which the third power unit 330 may be fixed, may be provided inside the third first housing 310. In addition, the third second housing 320 may be connected to the third rotation shaft 332 of the third power unit 330, thereby performing a pitch motion due to the third power unit 330. In other words, the third second housing 320 may simultaneously perform a yaw motion due to the first power unit 120 and a pitch motion due to the third power unit 330.

Similarly to the first power unit 120 or the second power unit 230, the third power unit 330 may include a member like a motor which is provided with power to produce a torque. The third power unit 330 may be embedded in the third housing, and more particularly, embedded and fixed in the third first housing 310. The third power unit 330 includes the third rotation shaft 332, which extends in the left-and-right direction, i.e., the Y-axis direction, and produces a roll motion. In other words, the third power unit 330 enables the third second housing 320 connected to the third rotation shaft 332 to perform a roll motion by rotating the third rotation shaft 332 extending in the left-and-right direction.

The connector 400 is provided to connect and fix an information collecting device to a gimbal according to embodiments of the present disclosure. The connector 400 may be, for example, a certain adhesive tape or a fixing means but is not limited thereto. The connector 400 may be located on the roll axis of the third axis compensator 300 and, as described above, provided in the third second neck portion 344. Accordingly, when the third power unit 330 operates and rotates the third second housing 320 of the third axis compensator 300, the connector 400 and the information collecting device connected to the connector 400 may perform a roll motion. In addition, since the third housing may perform a pitch motion and a yaw motion due to the second axis compensator 200 and the first axis compensator 100, the information collecting device may perform all of yaw, pitch and roll motions.

Desirably, the connector 400 may has a certain terminal unit to be electrically connected to a power source provided in the stand 10 or to a charging device. Accordingly, the information collecting device connected to the connector 400 may be provided with electric power and charged.

A sensor device (not shown) measures a rotation angle of a power unit. For example, the sensor device may be an encoder or a gyro sensor. The sensor device may be any device that can measure a rotation angle. Meanwhile, a first sensor device, a second sensor device, and a third sensor device, which respectively measure rotation angles of respective power units, may be provided in respective axis compensators, but the present disclosure is not limited thereto. For example, when a 3-axis gyro sensor that measures a rotation angle of each of all three axes is provided, a single sensor device may be located at one position. The rotation angle of each power unit, which is measured by the sensor device, may be transmitted to a controller and used to control the operation of the gimbal.

According to embodiments of the present disclosure, a gimbal includes the first axis compensator 100 configured to produce a yaw motion, the second axis compensator 200 connected to the first axis compensator 100 and configured to produce a pitch motion, the third axis compensator 300 connected to the second axis compensator 200 and configured to produce a roll motion, and the connector 400 configured to connect an information collecting device and the third axis compensator 300 to each other, wherein the yaw axis, the pitch axis, and the roll axis are sequentially connected between the stand 10 and the information collecting device, thereby preventing interference between axes, i.e., gimbal lock.

For example, a 3-axis gimbal according to the related art has a yaw-roll-pitch sequence, and therefore, interference between axes occurs when a portrait shot is taken in a vertical position. In other words, a pitch axis coincides with a yaw axis, causing gimbal lock in which the tilt function of the pitch axis disappears. Accordingly, only 2-axis driving is available, deteriorating the function of the gimbal and limiting shooting composition.

The gimbal lock results in a limit to available shooting composition during portrait shooting. In other words, since the gimbal in the vertical position cannot be controlled in the vertical direction during portrait shooting, only horizontal composition is available. For example, when there is a subject approaching from below or above the gimbal in this state, it is impossible to shoot the subject.

However, according to embodiments of the present disclosure, a gimbal has a yaw-pitch-roll sequence, thereby preventing interference between axes and gimbal lock. Therefore, a subject may be exactly captured and shot in any circumstance.

In addition, according to embodiments of the present disclosure, a gimbal includes the first axis compensator 100, the second axis compensator 200, and the third axis compensator 300, each of which has a certain solid structure such as a spherical or cylindrical shape, and therefore, the whole structure of the gimbal may be simple and compact. In particular, since the first through third axis compensators 100, 200, and 300 are arranged in a line in the vertical direction to form a tower structure which is similar to the structure of a selfie device (e.g., a selfie stick) according to the related art, it may be easy to carry and store the gimbal and the gimbal may be prevented from breaking down during storage.

Figure 6:
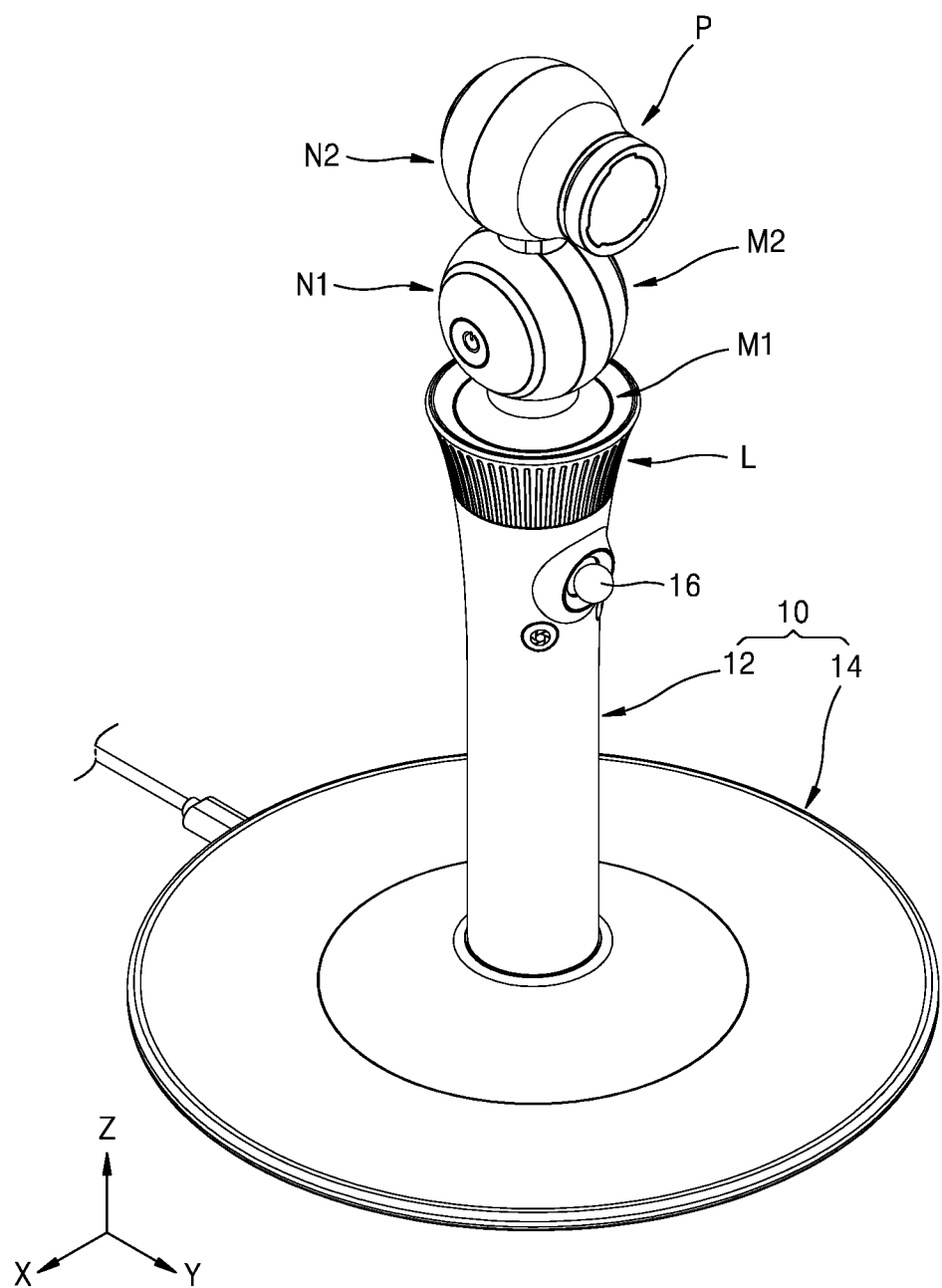
FIG. 6 is a diagram illustrating installation positions of a microphone in a gimbal, according to an embodiment of the present disclosure.

FIG. 6 is a diagram illustrating installation positions of a microphone in a gimbal, according to an embodiment of the present disclosure.

Desirably, according to an embodiment of the present disclosure, a gimbal may further include a microphone module.

The microphone module is a device that may collect an external sound signal or receive a voice command. The microphone module may transmit the sound signal or the voice command to the gimbal or an information collecting device or the like connected to the gimbal. The microphone module may include at least one certain microphone suitable for sound signal collection. The microphone may be connected to at least one of the stand 10, the first axis compensator 100, the second axis compensator 200, and the third axis compensator 300.

A method of connecting the microphone is not particularly defined here. For example, the microphone may be embedded in a certain space provided in the housing or the like, or a certain connecting means connecting the microphone to the housing may be provided.

For example, when the microphone is attached to the stand 10, the position of the microphone is fixed. Accordingly, sound is collected regardless of the operation of the gimbal.

Meanwhile, the microphone may be attached to the first axis compensator 100, as shown by an arrow M1 or M2. Alternatively, the microphone may be attached to the second axis compensator 200, as shown by an arrow N1 or N2. In this case, the microphone may perform a yaw motion or simultaneously perform a yaw motion and a pitch motion.

Desirably, the microphone may be attached to the third second housing 320 of the third axis compensator 300, as shown by an arrow P, and may perform a yaw motion, a pitch motion, and a roll motion. In this case, the microphone may change directions integrally with an information collecting device attached to the gimbal. In other words, the microphone may operate along with the movement of the information collecting device. Accordingly, voice command reception and sound signal collection may be effective performed. For example, when a subject is an object, e.g., a dog, which makes a sound, the microphone moves following the position of the subject while the subject is being tracked and filmed, so that realistic filming may be possible.

The attaching of a microphone is not limited to gimbals that have a yaw-pitch-roll sequence but may also be applied to gimbals that have a yaw-roll-pitch sequence according to the related art.

Desirably, according to an embodiment of the present disclosure, a gimbal may include a certain speaker module (not shown). Similarly to a microphone module, the speaker module may have a certain speaker, which may be connected to at least one of the stand 10, the first axis compensator 100, the second axis compensator 200, and the third axis compensator 300. In other words, the speaker may be installed to at least one of positions respectively marked with arrows M1, M2, N1, N2, and P in FIG. 6. A method of connecting the speaker is not particularly defined. For example, the speaker may be embedded in a certain space provided in the housing or the like, or a certain connecting means connecting the speaker to the housing may be provided.

The speaker may include an omnidirectional speaker or a directional speaker. When the speaker includes an omnidirectional speaker, the speaker may radiate sound in all particular direction. When the speaker includes a directional speaker, the speaker may radiate sound in a desired direction in connection with the operation of the gimbal. For example, when the speaker is an omnidirectional speaker, it may be attached to the stand 10 and may radiate sound in all directions. When the speaker is a directional speaker, it may be attached to the first axis compensator 100, the second axis compensator 200, or the third axis compensator 300 and may radiate sound in a certain direction. However, the present disclosure is not limited thereto.

Desirably, according to an embodiment of the present disclosure, a gimbal may further include a lighting module (not shown). The lighting module may include a certain lighting device, which is connected to at least one of the stand 10, the first axis compensator 100, the second axis compensator 200, and the third axis compensator 300. In other words, each lighting device may be installed to a position marked with one of the arrows M1, M2, N1, N2, and P. Accordingly, brightness may be secured in a dark environment, and desirably brightness in a direction in which shooting is performed may be secured in connection with the operation of the gimbal.

The lighting module may be a device for measuring a distance. For example, the lighting module may be provided to measure a distance between a subject and the gimbal (or a device mounted on the gimbal) like a certain dot projector and reflect the distance in the operation of the gimbal.

Desirably, according to an embodiment of the present disclosure, a gimbal may include a controller that controls the operation of the gimbal to change the alignment of an information collecting device connected to the gimbal. The controller may exchange electrical signals with the information collecting device and operate in connection with the information collecting device according to an instruction given to the information collecting device.

For example, when an instruction to track a certain subject is given to the information collecting device, the information collecting device may include an algorithm for capturing the subject and a certain gimbal control algorithm for moving the gimbal to align the information collecting device to the movement of the captured subject. The controller of the gimbal may operate a drive unit in the gimbal according to an instruction given to the gimbal control algorithm in the information collecting device.

Figure 7:
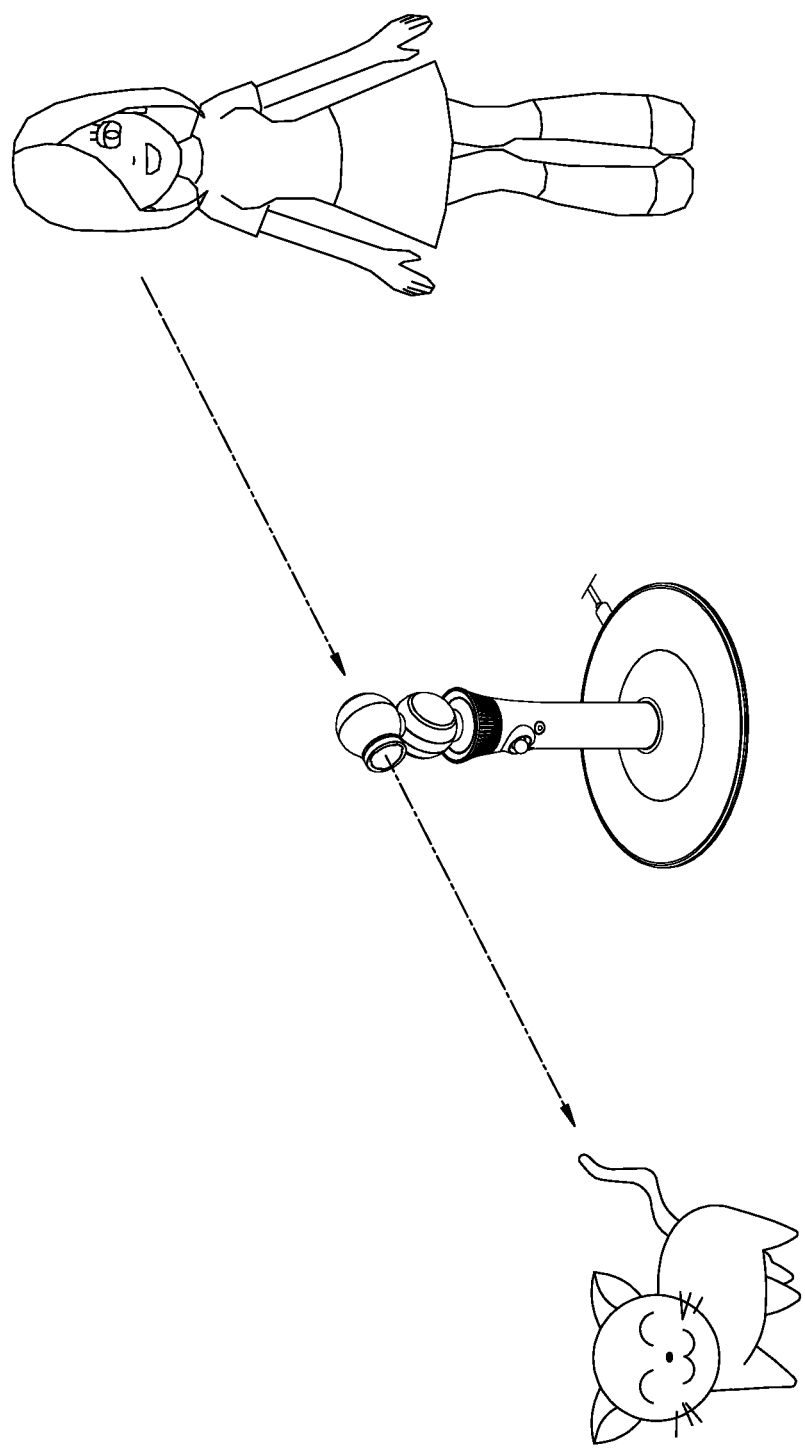
FIG. 7 is a diagram of an example of operation of a gimbal, according to an embodiment of the present disclosure.

FIG. 7 is a diagram of an example of the operation of a gimbal, according to an embodiment of the present disclosure. For example, when a user of the gimbal gives an instruction to track and film a cat, an algorithm in the gimbal or an information collecting device drives a drive unit in the gimbal according to the user's instruction to capture the location of the cat. At this time, an algorithm for capturing a subject corresponding to the user's instruction may be configured to compare data in a certain database or data recorded in a web with data of objects caught in a current sight. Alternatively, the algorithm may be configured to capture a subject on which certain information has already been registered, but the algorithm is not limited thereto. Such algorithm for capturing a subject may be referred to as a certain capturing algorithm.

Thereafter, when the cat, i.e., the captured subject, moves, an algorithm in the gimbal or the information collecting device drives a drive unit in the gimbal according to the movement of the subject to move the information collecting device according to the movement of the cat. Such algorithm for tracking a subject may be referred to as a certain tracking algorithm.

In addition, when an instruction to track a certain sound is given to the gimbal, an algorithm for capturing the location of the source of the sound and a certain control algorithm for moving the gimbal according to the captured location of the sound source may be included in the controller. For this, a certain algorithm for distinguishing a particular sound source from ambient noise and a certain algorithm for operating a drive unit in the gimbal according to the movement of the sound source may be provided. In particular, when shooting is performed using sound in a dark environment, those algorithms may be used.

Such an instruction may be issued using a user's certain input signal or voice command. For this, the controller of the gimbal may include a voice recognition algorithm for recognizing a user's voice command. In addition, the recognizing of a voice command and the capturing of a sound source may be performed using the microphone module described above.

Such algorithms may be embedded in the information collecting device and the controller of the gimbal to exchange signals with each other and control the operations of the gimbal and the information collecting device.

Figure 8:
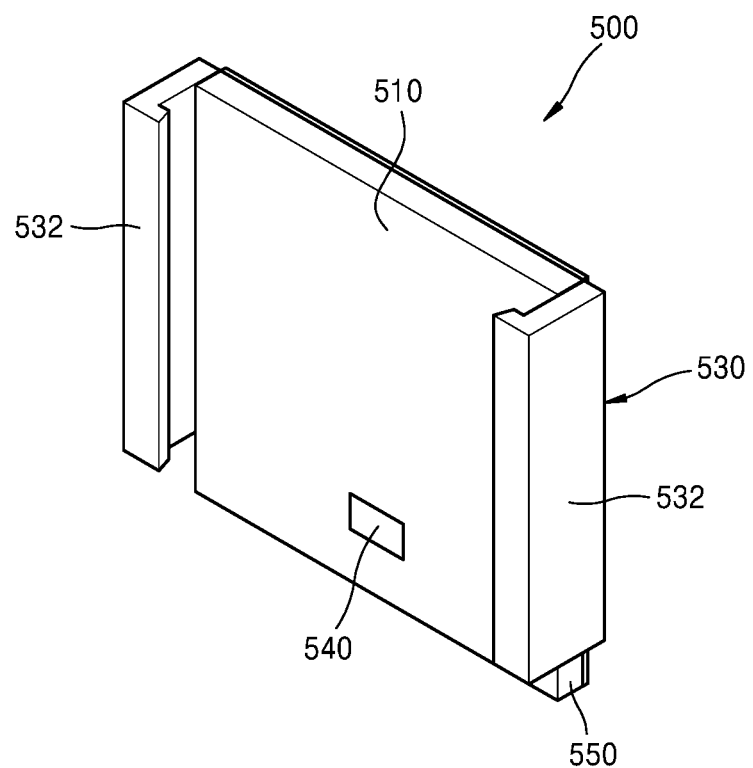
FIGS. 8 and 9 are diagrams of an example of a holder which may be used to connect a certain mobile device to a gimbal according to embodiments of the present disclosure.
Figure 9:
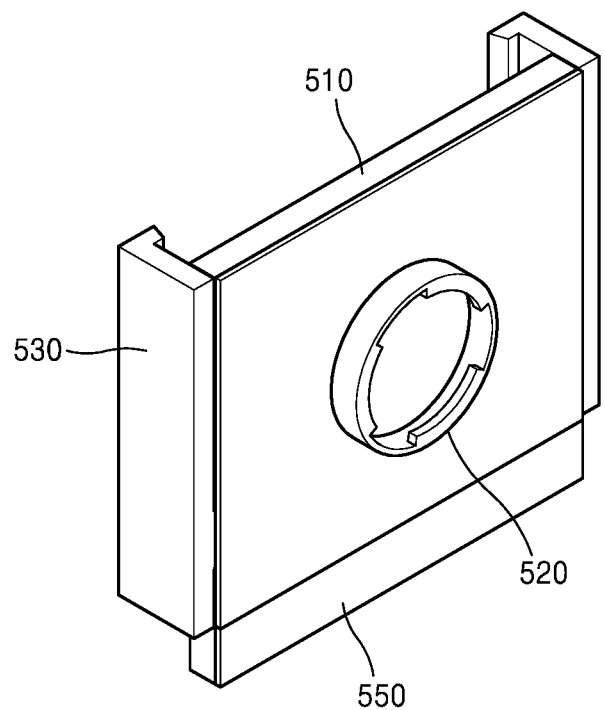

FIGS. 8 and 9 are diagrams of an example of a holder 500 which may be used to connect a certain mobile device to a gimbal according to embodiments of the present disclosure.

Figure 10:
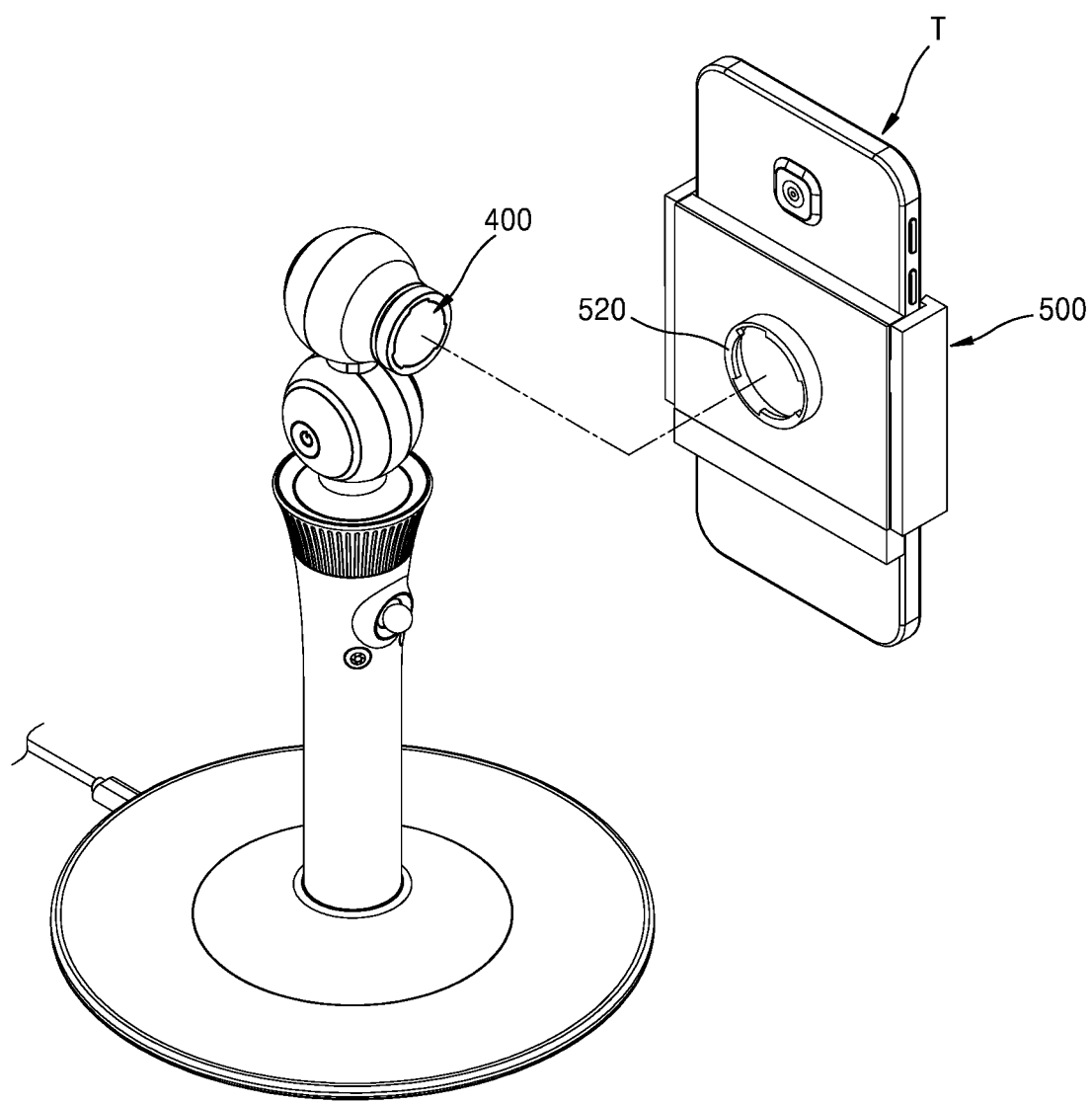
FIG. 10 is diagram of a state in which a mobile device is installed onto a holder.

FIG. 10 is diagram of a state in which a mobile device is installed onto the holder 500.

The holder 500 may mediate the connector 400 of the gimbal and a certain mobile device as an information collecting device such that the mobile device may be installed onto the gimbal. As shown in FIG. 10, a mobile device T may be installed onto the gimbal via the holder 500. However, FIGS. 8 through 10 show only an example, and various types of holding devices may be used.

The holder 500 may include a support 510 supporting a mobile device, a fastening portion 520 fixed to the support 510 and coupled to the connector 400 of the gimbal, and a gripper 530 installed on the support 510 to grip the mobile device.

The support 510 may at least partially support a mobile device and have a certain plate shape but is not limited thereto. A certain operation module may be embedded in the support 510 to operate the gripper 530, which will be described below. The operation module may include a certain actuator, which may operate the gripper 530 according to a certain signal, and a controller controlling the operation of the actuator.

The fastening portion 520 may be fixed to a side of the support 510 and coupled to the connector 400 of the gimbal. The fastening portion 520 may have a fastening structure corresponding to a shape of the connector 400 to be coupled to the connector 400. In addition, the fastening portion 520 may include a certain magnet to be attached to the connector 400. Desirably, the fastening portion 520 may have a certain terminal to exchange signals with the gimbal. The terminal may exchange electrical signals with a certain terminal unit provided in the connector 400.

The gripper 530 may be installed onto the support 510 to grip a mobile device. For example, the gripper 530 may include grip arms 532 respectively located at opposite sides of the support 510. The grip arms 532 may be configured to have a variable distance therebetween, thereby gripping and releasing the mobile device.

According to an embodiment, the holder 500 may include a certain sensor. For example, the sensor may include a proximity sensor 540, which may detect approach of a mobile device, and a motion sensor 550, which may detect a motion of a user's hand.

For example, the proximity sensor 540 may be located in a front surface of the support 510, as shown in FIG. 8. However, the present disclosure is not limited thereto, and the proximity sensor 540 may be located in a random portion or multiple portions of the support 510. The proximity sensor 540 may detect approach of a mobile device. For example, when the proximity sensor 540 detects that a mobile device has approached, the operation module in the support 510 may operate the gripper 530 to grip the mobile device.

For example, the motion sensor 550 may be located at a bottom of the support 510, as shown in FIGS. 8 and 9. However, the present disclosure is not limited thereto, and the motion sensor 550 may be located in a random portion or multiple portions of the support 510. When a user detaches a mobile device from the holder 500, the motion sensor 550 may detect the user's motion (e.g., hand) and release the grip of the gripper 530. Desirably, the operation module may include a certain algorithm such that when a user's motion is detected, whether the motion is made to detach a mobile device from the holder 500 is accurately determined and the operation of the gripper 530 is controlled. The algorithm may capture a direction in which a user approaches to a mobile device, an approaching angle, an approaching speed, etc. or may accurately detect whether the user grabs the mobile device and applies a force in a direction in which the mobile device is detached.

Meanwhile, at least one of the microphone module, the lighting module, and the speaker module, which have been described above, may be further installed in the holder 500. In other words, the microphone module, the lighting module, and the speaker module may be installed in the holder 500 installed onto the gimbal, apart from a main body of the gimbal.

While preferred embodiments have been shown and described, the present disclosure is not limited thereto. It is apparent that various modifications can be made in the embodiments by those skilled in the art without departing from the spirit of the present disclosure as defined by the appended claims. The modifications will not be considered separately from the spirits or perspectives of the present disclosure.

The invention claimed is:

1. A gimbal used for an information collecting device for shooting or recording, the gimbal comprising:
a stand;
a first axis compensator connected to the stand and configured to produce a yaw motion;
a second axis compensator connected to the first axis compensator and configured to produce a pitch motion;
a third axis compensator connected to the second axis compensator and configured to produce a roll motion; and
a connector configured to connect the information collecting device and the third axis compensator to each other,
wherein a yaw axis, a pitch axis, and a roll axis are sequentially connected between the stand and the information collecting device,
wherein the first axis compensator comprises:
a first housing connected to the stand; and
a first power unit comprising a first rotation shaft and configured to rotate the first rotation shaft to produce the yaw motion, the first rotation shaft extending in a vertical direction,
the second axis compensator comprises:
a second housing connected to the first rotation shaft of the first power unit and configured to perform the yaw motion; and
a second power unit embedded in the second housing, comprising a second rotation shaft, and configured to rotate the second rotation shaft to produce the pitch motion, the second rotation shaft extending in a horizontal direction, and
the third axis compensator comprises:
a third housing connected to the second rotation shaft of the second power unit and configured to perform the pitch motion; and
a third power unit embedded in the third housing, comprising a third rotation shaft, and configured to rotate the third rotation shaft to produce the roll motion, the third rotation shaft extending in the horizontal direction and being orthogonal to the second rotation shaft, and
wherein the second housing has a spherical shape and comprises a second first housing combined with a second housing, the second first housing having a hemispherical shape and arranged in a front portion of the second housing, and the second housing having a hemispherical shape and arranged in a back portion of the second housing,
the second first housing has a bottom connected to the first rotation shaft such that the yaw motion is able to be performed,
the second power unit is fixed to the second first housing, and
the second housing is connected to the second rotation shaft such that the pitch motion is able to be performed.

2. The gimbal of claim 1, wherein the third housing has a spherical shape and comprises a third first housing combined with a third second housing, the third first housing having a hemispherical shape and arranged at a right portion of the third housing, and the third second housing having a hemispherical shape in a left portion of the third housing,
the third first housing has a bottom connected to the second rotation shaft such that the pitch motion is able to be performed,
the third power unit is fixed to the third first housing, and
the third second housing is connected to the third rotation shaft such that the roll motion is able to be performed.

3. The gimbal of claim 2, wherein the connector is connected to the third second housing and the information collecting device to enable the information collecting device to perform the roll motion.

4. The gimbal of claim 1, further comprising a microphone module, wherein the microphone module is connected to at least one of the stand, the first axis compensator, the second axis compensator, and the third axis compensator.

5. The gimbal of claim 1, further comprising a speaker module, wherein the speaker module is connected to at least one of the stand, the first axis compensator, the second axis compensator, and the third axis compensator.

6. The gimbal of claim 1, further comprising a lighting module which produces light, wherein the lighting module is connected to at least one of the stand, the first axis compensator, the second axis compensator, and the third axis compensator.

7. The gimbal of claim 1, further comprising a holder connected to the connector and configured to grip the information collecting device.

8. The gimbal of claim 7, wherein the holder comprises:
a gripper configured to grip the information collecting device; and
a sensor configured to generate a signal for controlling an operation of the gripper.

* * * * *